United States Patent
Phillips et al.

(10) Patent No.: US 7,099,349 B1
(45) Date of Patent: Aug. 29, 2006

(54) XDSL-BASED COMMUNICATION SYSTEM

(75) Inventors: Bruce A. Phillips, Highlands Ranch, CO (US); Darwei Kung, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/265,214

(22) Filed: Mar. 10, 1999

(51) Int. Cl.
*H04B 7/212* (2006.01)
*H04L 12/413* (2006.01)

(52) U.S. Cl. .................... 370/442; 370/447
(58) Field of Classification Search ........... 370/352, 370/441–447, 480, 481, 482, 485, 487, 493; 375/222

See application file for complete search history.

(56) References Cited

U.S. PATENT DOCUMENTS

| | | | | |
|---|---|---|---|---|
| 4,596,011 A | * | 6/1986 | Kobayashi et al. | 370/445 |
| 4,868,850 A | * | 9/1989 | Kaku et al. | 375/222 |
| 6,075,814 A | * | 6/2000 | Yamano et al. | 375/222 |
| 6,101,216 A | * | 8/2000 | Henderson et al. | 375/222 |
| 6,148,006 A | * | 11/2000 | Dyke et al. | 370/480 |
| 6,188,669 B1 | * | 2/2001 | Bellenger | 370/230 |
| 6,192,109 B1 | * | 2/2001 | Amrany et al. | 379/30 |
| 6,205,220 B1 | * | 3/2001 | Jacobsen et al. | 379/406.12 |
| 6,215,793 B1 | * | 4/2001 | Gultekin et al. | 370/464 |
| 6,282,189 B1 | * | 8/2001 | Eames | 370/352 |
| 6,282,273 B1 | * | 8/2001 | McHale et al. | 379/93.28 |
| 6,307,889 B1 | * | 10/2001 | Chun | 375/260 |
| 6,310,894 B1 | * | 10/2001 | Counterman | 370/484 |
| 6,345,071 B1 | * | 2/2002 | Hamdi | 375/222 |
| 6,388,990 B1 | * | 5/2002 | Wetzel | 370/230 |
| 6,414,952 B1 | * | 7/2002 | Foley | 370/352 |
| 6,549,568 B1 | * | 4/2003 | Bingel | 375/222 |
| 6,580,785 B1 | * | 6/2003 | Bremer et al. | 379/88.13 |

\* cited by examiner

*Primary Examiner*—Andrew C. Lee
(74) *Attorney, Agent, or Firm*—Brooks Kushman P.C.

(57) ABSTRACT

Broadband communication systems and methods of the type utilizing xDSL packet-based technologies are configured to provide packet-based point-to-multipoint communication between an upstream xDSL modem and a plurality of downstream xDSL modems. The system preferably includes a twisted pair connecting the upstream xDSL modem to the plurality of downstream xDSL modems, with each downstream xDSL modem being in communication with a corresponding tap along the twisted pair.

2 Claims, 2 Drawing Sheets

XDSL-BASED COMMUNICATION SYSTEM

TECHNICAL FIELD

The present invention relates to packet-based xDSL architectures for broadband communication systems.

BACKGROUND ART xDSL is a generic term for digital subscriber line equipment and services, including packet-based architectures, such as ADSL, HDSL, SDSL, VDSL, and RADSL. That is, x is the generic. xDSL technologies provide extremely high bandwidth over embedded twisted pair, copper cable plant. xDSL technologies offer great potential for bandwidth-intensive applications, such as Internet access, remote LAN access, video conferencing, and video-on-demand.

ADSL or asymmetric digital subscriber line services generally use existing unshielded twisted pair (UTP) copper wires from the telephone company's central office to the subscriber's premise, utilize electronic equipment in the form of ADSL modems at both the central office and the subscriber's premise, send high-speed digital signals up and down those copper wires, and send more information one way than the other. The ADSL flavor of xDSL services is capable of providing a downstream bandwidth of about 1.5 Mbps–8 Mbps, and an upstream bandwidth of about 16 Kbps–64 Kbps with loop distances ranging from about 3.7 km–5.5 km. HDSL or high bit rate digital subscriber line services provide a symmetric, high-performance connection over a shorter loop, and typically require two or three copper twisted pairs. HDSL is capable of providing both upstream and downstream bandwidth of about 1.5 Mbps, over loop distances of up to about 3.7 km. SDSL or single line digital subscriber line services provide a symmetric connection that matches HDSL performance using a single twisted pair, but operating over a shorter loop of up to about 3.0 km. VDSL or very high bit rate digital subscriber line services are typically implemented in asymmetric form, as a very high speed variation on the ADSL theme over a very short loop. Specifically, target downstream performance is typically about 52 Mbps over UTP local loops of 300 m, 26 Mbps at 1,000 m, and 13 Mbps at 1,500 m. Upstream data rates in asymmetric implementations tend to range from about 1.6 Mbps to about 2.3 Mbps. Additionally, there is RADSL or rate adaptive digital subscriber line services. RADSL provides a dynamic connection that adapts to the length and quality of the line.

In the xDSL family of services, many xDSL themes, including ADSL, HDSL, SDSL, VDSL, and RADSL, utilize a packet-based approach that does away with the line-grabbing practice of circuit switched networks, such as ISDN. This packet-based approach is very advantageous in a variety of situations, such as high-speed data services, including high definition television or HDTV transmissions.

In the group of xDSL services, VDSL services are of particular interest for a hybrid local loop scenario. In a particular VDSL application, fiber-to-the-neighborhood (FTTN) provides distribution from the central office to the neighborhood, and VDSL over UTP carries the signal the last leg to the individual residential premise. In such an architecture, each customer has their own dedicated VDSL loop extending from the neighborhood node to the customer. In particular, the existing copper twisted pair running to the customer is sometimes utilized for VDSL transmissions. That is, existing xDSL architectures provide point-to-point communication between the neighborhood node and the customer premise.

As VDSL and other xDSL technologies are currently in the early development stages, there is a need for improved xDSL-based communication systems that take greater advantage of xDSL capabilities than do any existing xDSL services.

DISCLOSURE OF INVENTION

It is, therefore, an object of the present invention to provide a broadband communication system utilizing packet-based xDSL technologies to provide point-to-multipoint communications.

In carrying out the above object, a broadband communication system of the type utilizing xDSL packet-based technologies is provided. The system comprises an upstream xDSL modem, a twisted pair, a plurality of taps defined along the twisted pair, and a plurality of downstream xDSL modems. The twisted pair is connected to the upstream xDSL modem. Each downstream xDSL modem is in communication with a corresponding tap of the plurality of taps. The upstream xDSL modem and the plurality of downstream xDSL modems are configured to provide packet-based point-to-multipoint communication between the upstream xDSL modem and the plurality of downstream xDSL modems.

In a preferred embodiment, the upstream xDSL modem and the plurality of downstream xDSL modems are VDSL modems. Further, in a suitable embodiment, the twisted pair is an unshielded copper twisted pair, such as a Category 3 or a Category 5 twisted pair. Further, in a suitable configuration, the upstream xDSL modem and the plurality of downstream xDSL modems are configured to provide packet-based point-to-multipoint communication in a packet-switched network, or alternatively, in a cell-switched network.

Preferably, the plurality of downstream xDSL modems are operative to transmit to the upstream xDSL modem in a contention-based protocol or a time division multiplexing-based protocol. And, preferably, the upstream xDSL modem is operative to transmit to the plurality of downstream xDSL modems in a broadcast-based protocol.

Further, in carrying out the present invention, a broadband communication system of the type utilizing xDSL packet-based technologies is provided. The system comprises a central office, an upstream xDSL modem in communication with the central office, a twisted pair, a plurality of taps defined along the twisted pair, and a plurality of downstream xDSL modems. The upstream xDSL modem and the plurality of downstream xDSL modems are configured to provide packet-based point-to-multipoint communication between the upstream xDSL modem and the plurality of downstream xDSL modems. The upstream xDSL modem may be located, for example, within the central office or outside of the central office with a fiber connecting the central office to the upstream xDSL modem.

Still further, in carrying out the present invention, a broadband communication method for xDSL packet-based applications is provided. The method comprises broadcasting from a point, over a twisted pair, with an upstream xDSL modem. The method further comprises receiving at a plurality of points with a plurality of downstream xDSL modems. Each downstream xDSL modem is in communication with a corresponding tap of a plurality of taps defined along the twisted pair. The upstream xDSL modem and the plurality of downstream xDSL modems are configured to provide packet-based point-to-multipoint communication between the upstream xDSL modem and the plurality of downstream xDSL modems.

The advantages associated with embodiments of the present invention are numerous. For example, embodiments of the present invention provide packet-based point-to-multipoint communication utilizing xDSL technologies over a twisted pair. Advantageously, the packet-based switching may be implemented as a packet-switched network wherein packets vary in size and/or frequency, or in a cell-switched network wherein packets have a constant size and are transmitted at a constant rate.

Advantageously, multi-point xDSL, and particularly VDSL, in accordance with the present invention allows the flexibility of providing multiple users or customers with VDSL (or other packet-based xDSL technology) related services with a single twisted pair, such as an unshielded copper twisted pair. Further, multi-point xDSL of the present invention allows the service provider to attach an xTU-R device or remote terminal unit on the network side of the network interface, thereby sharing bandwidth to provide services for multiple applications via a single xDSL twisted pair.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
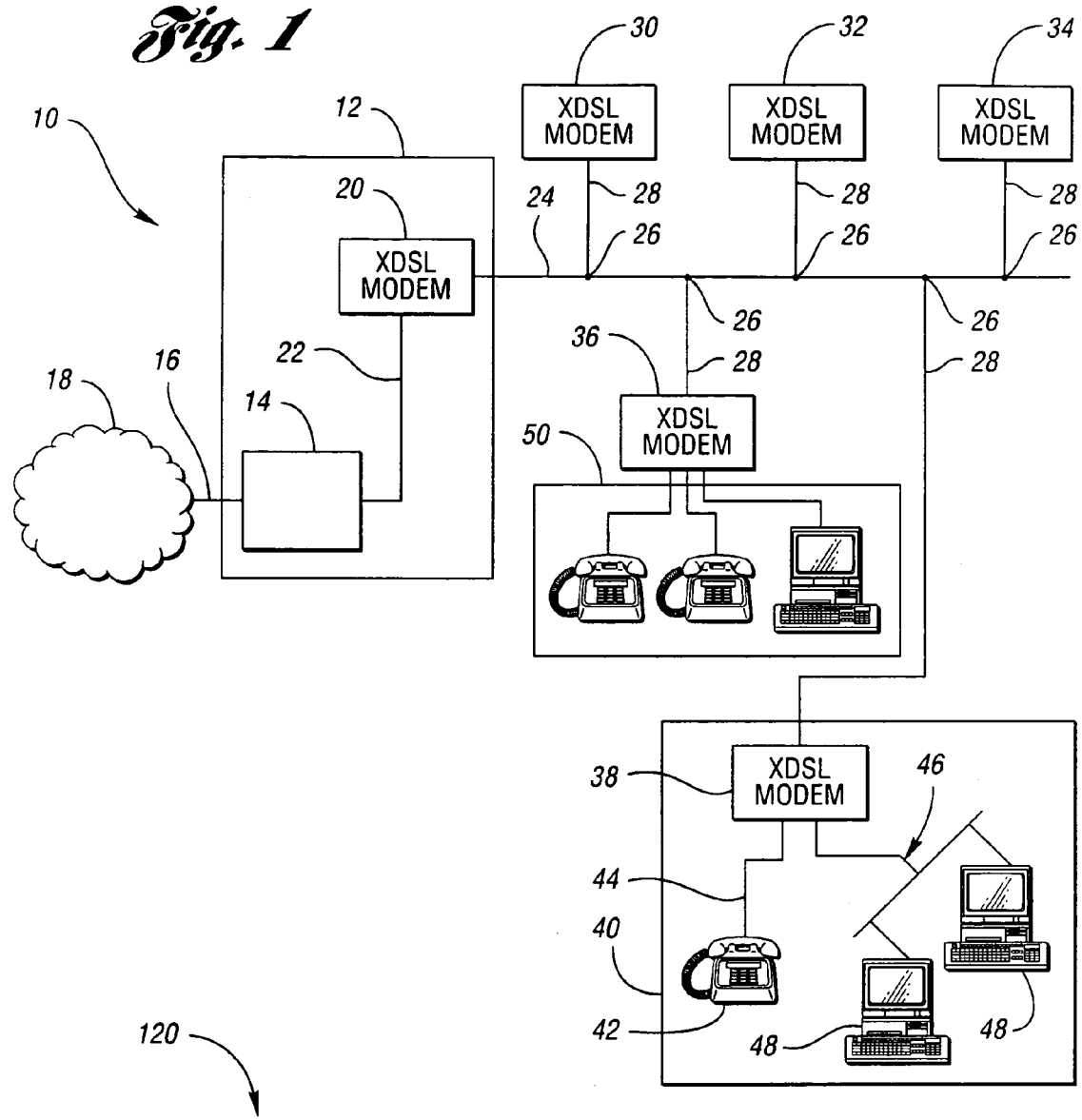
FIG. 1 is a broadband communication system of the present invention utilizing xDSL packet-based technologies to provide point-to-multipoint communication.

Referring to FIG. 1, a broadband communication system of the type utilizing xDSL packet-based technologies in accordance with the present invention is generally indicated at 10. System 10 includes a central office 12 connected to a high-speed network 14. A suitable high-speed network is an asynchronous transfer mode (ATM) network. Network 14 is optionally connected by a fiber 16 to an external network 18. In accordance with this embodiment of the present invention, network 14 is connected to an xDSL modem 20, preferably, by a fiber 22. xDSL modem 20, which has a connection to central office 12, is referred to for convenience in reference as the upstream xDSL modem. A twisted pair 24 is connected to upstream xDSL modem 20.

A plurality of taps 26 are defined along twisted pair 24. A plurality of twisted pairs 28 extend from the plurality of taps 26 and connect to a plurality of downstream xDSL modems 30,32,34,36,38. Upstream xDSL modem 20 and downstream xDSL modems 30,32,34,36,38 are configured to provide packet-based point-to-multipoint communication between upstream xDSL modem 20 and the plurality of downstream xDSL modems 30,32,34,36,38.

Accordingly, the xDSL modems may be configured with appropriate hardware and/or software to provide network interface capabilities. In one suitable embodiment, the xDSL modems are VDSL modems, and the twisted pair loop lengths are selected accordingly based on desired upstream and downstream transfer rates. Of course, it is to be appreciated that the xDSL modems may alternatively be HDSL or SDSL modems, as desired, provided that appropriate loop lengths are used and that the data transfer rate capabilities of such alternative modems are sufficient for the intended purpose. In a suitable implementation, twisted pair 24 is an unshielded twisted pair (UTP), such as a copper twisted pair. Further, examples of suitable twisted pair cabling are Category 3 twisted pair and Category 5 twisted pair cabling.

Each downstream xDSL modem 30,32,34,36,38 may be configured as desired to provide the end user or customer with a variety of services. For example, downstream xDSL modem 38 provides service to user site 40 which may be a residence. xDSL modem 38 is connected to telephone 42 by line 44, and is connected to network 46 as well. Network 46 includes computers 48. As is appreciated by one of ordinary skill in the xDSL modem art, xDSL modem 38 may be configured to provide a variety of services including service for telephone 42 and computer network 46, preferably, simultaneously.

Of course, it is to be appreciated that the network defined by twisted pair 24, taps 26, twisted pairs 28, upstream xDSL modem 20, and downstream xDSL modems 30,32,34,36,38 may be implemented as a packet-switched network, or alternatively as a cell-switched network, as desired. As such, the xDSL modems should be configured appropriately for the type of switching for the network. In point-to-multipoint networks of the present invention, it is suitable that downstream xDSL modems 30,32,34,36,38 are operative to transmit to upstream xDSL modem 20 in a contention-based protocol. For example, carrier sense multiple access/collision detection (CSMA/CD) is one example of a known contention-based protocol. Further, another suitable protocol for upstream transmissions is a time division multiplexing (TDM) based protocol. In a TDM-based protocol, each downstream xDSL modem (or xTU-R or remote terminal unit) is assigned a specific time slot to transmit data to the upstream xDSL modem (or xTU-C or the central office terminal unit). Further, in a suitable implementation, upstream xDSL modem 20 is operative to transmit to downstream xDSL modems 30,32,34,36,38 in a broadcast-based protocol.

It is to be appreciated that system 10 allows multiple receiving modems to receive data from the upstream modem, utilizing a single twisted pair 24. As such, system 10 is very advantageous in that a single pair of copper may be utilized to provide multiple users with xDSL (preferably VDSL) related services. Further, as shown at user site 50, embodiments of the present invention may be configured with the xTU-R or remote terminal unit which includes downstream xDSL modem 36 on the network side of the network interface, thereby sharing bandwidth to provide services for multiple applications via a single xDSL twisted pair.

Figure 2:
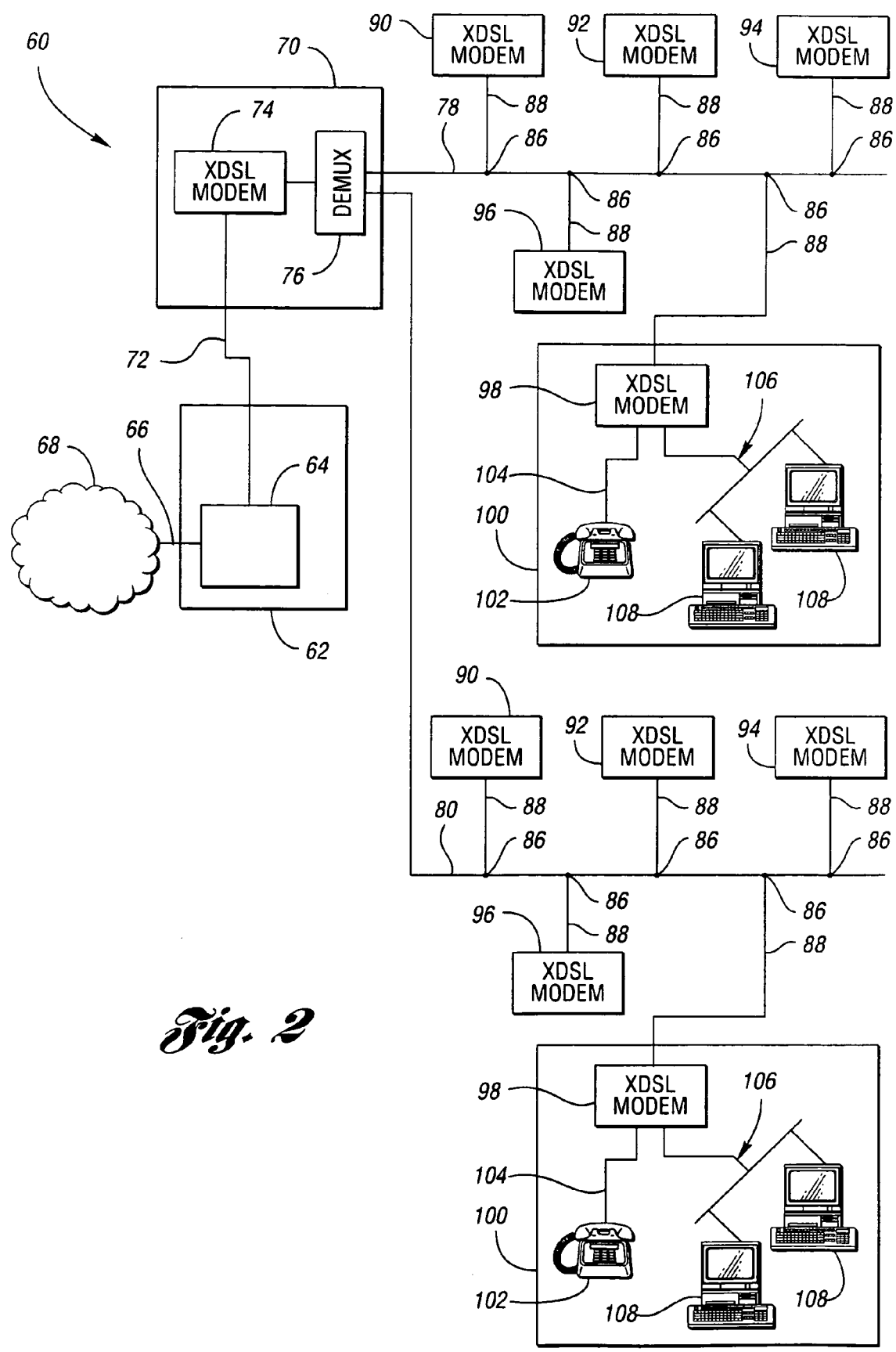
FIG. 2 is an alternative embodiment of a broadband communication system of the present invention that utilizes xDSL packet-based technologies to provide point-to-multipoint communication.

With reference to FIG. 2, an alternative embodiment of the present invention is generally indicated at 60. System 60 includes central office 62 including a high-speed network 64. High-speed network 64 is optionally connected with fiber 66 to external network 68. In accordance with the present invention, a network node 70 is connected to central office 62 by a fiber 72. An upstream xDSL modem 74 is then located at node 70, outside of central office 62, and receives information from fiber 72. That is, embodiments of the present invention in addition to being appropriate for use wherein a twisted pair is routed directly from the central office (FIG. 1), are alternatively useful in a fiber-to-the-neighborhood (FTTN) arrangement, such as that illustrated in FIG. 2. Further, if desired, upstream xDSL modem 74 may be connected to a demultiplexer 76 such that upstream xDSL modem 74 may provide service to more than one network. Of course, it is to be appreciated that a demultiplexer may also be utilized in embodiments similar to that shown in FIG. 1, if desired. A suitable device for multiplexing and demultiplexing xDSL signals is a DSLAM or digital subscriber line access multiplexor which preferably utilizes time division multiplexing (TDM) and may be located at the central office or at a remote line shelf such as the network node 70.

With continuing reference to FIG. 2, upstream xDSL modem 74 connects to a plurality of twisted pairs, such as twisted pairs 78 and 80, through demultiplexer 76. For convenience, the networks connected to twisted pairs 78 and 80 are shown as identical, but it is appreciated that each network is independent from the other and may be configured in a variety of ways. In accordance with the present invention, each twisted pair 78 and 80 has a plurality of taps 86, with a plurality of connections 88 connecting to a plurality of downstream xDSL modems 90,92,94,96,98. Each downstream xDSL modem may be configured to provide a variety of services to an end user, such as, for example, user site 100 at xDSL modem 98. User site 100 includes a phone 102 connected by line 104 to xDSL modem 98, and a computer network 106 also connected to xDSL modem 98. Computer network 106 includes a plurality of computers 108. Of course, the user site may be connected in a variety of other ways, such as to a device on the network side of the network interface similar to that shown in FIG. 1 at 50 to share bandwidth for multiple applications.

Figure 3:
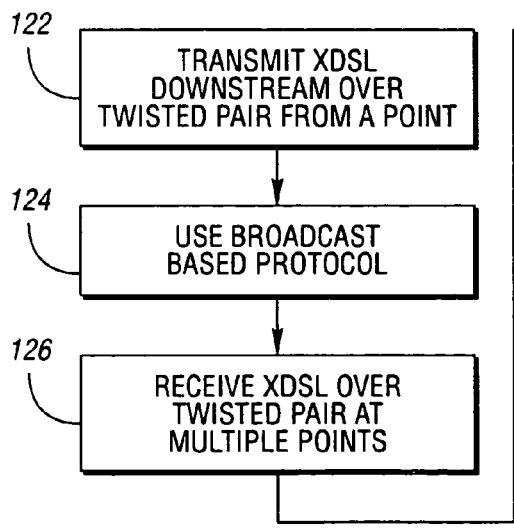
FIG. 3 is a block diagram illustrating a method of the present invention for xDSL packet-based point-to-multipoint communication.
Figure 3:
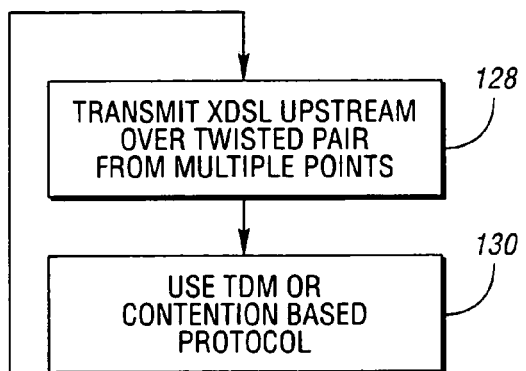

With reference to FIG. 3, a method of the present invention for broadband communication in xDSL packet-based applications is generally indicated at 120. At block 122, an xDSL transmission is sent downstream over a twisted pair from a point. This xDSL transmission is sent from the upstream xDSL modem. At block 124, preferably, a broadcast-based protocol is utilized during the downstream xDSL transmission from the upstream xDSL modem. At block 126, the xDSL transmission is received over the twisted pair at multiple points. Each point of the multiple points has a downstream xDSL modem for receiving the transmission. In accordance with the present invention, the upstream xDSL modem and the downstream xDSL modems are configured to provide packet-based point-to-multipoint communication between the upstream xDSL modem and the plurality of downstream xDSL modems.

In one suitable implementation, as shown at blocks 128 and 130, upstream xDSL transmissions over the twisted pair from the multiple points preferably use a TDM or a contention-based protocol. It is to be appreciated that embodiments of the present invention provide packet-based point-to-multipoint communication for xDSL technologies, and are preferably implemented in VDSL. Further, it is appreciated that applications of the present invention may be implemented in other packet-based xDSL technologies where appropriate.

While the best mode for carrying out the invention has been described in detail, those familiar with the art to which this invention relates will recognize various alternative designs and embodiments for practicing the invention as defined by the following claims.

What is claimed is:

1. A broadband communication system of the type utilizing xDSL packet-based technologies, the system comprising:
    an upstream xDSL modem;
    a twisted pair connected to the upstream xDSL modem;
    a plurality of taps defined along the twisted pair;
    a plurality of downstream xDSL modems at a plurality of user sites, each downstream xDSL modem being in communication with a corresponding tap of the plurality of taps, the upstream xDSL modem and the plurality of downstream xDSL modems providing packet-based point-to-multipoint communication between the upstream xDSL modem and the plurality of downstream xDSL modems at the plurality of user sites; and
    wherein the taps are located along the twisted pair between the upstream xDSL modem and the plurality of user sites, wherein the plurality of downstream xDSL modems are operative to transmit to the upstream xDSL modem in a contention-based protocol, and wherein the upstream xDSL modem is operative to transmit to the plurality of downstream xDSL modems in a broadcast-based protocol.

2. A broadband communication method for xDSL packet-based applications, the method comprising:
    broadcasting from a point, over a twisted pair, with an upstream xDSL modem;
    receiving at a plurality of points with a plurality of downstream xDSL modems at a plurality of user sites, each downstream xDSL modem being in communication with a corresponding tap of a plurality of taps defined along the twisted pair between the upstream xDSL modem and the plurality of user sites, the upstream xDSL modem and the plurality of downstream xDSL modems providing packet-based point-to-multipoint communication between the upstream xDSL modem and the plurality of downstream xDSL modems at the plurality of user sites;
    transmitting from the plurality of downstream xDSL modems to the upstream xDSL modem in a contention-based protocol; and
    transmitting from the upstream xDSL modem to the plurality of downstream xDSL modems in a broadcast-based protocol.

* * * * *